M. A. CAUDLE.
HARROW ATTACHMENT.
APPLICATION FILED MAY 24, 1917.
1,251,636.
Patented Jan. 1, 1918.
2 SHEETS—SHEET 1.
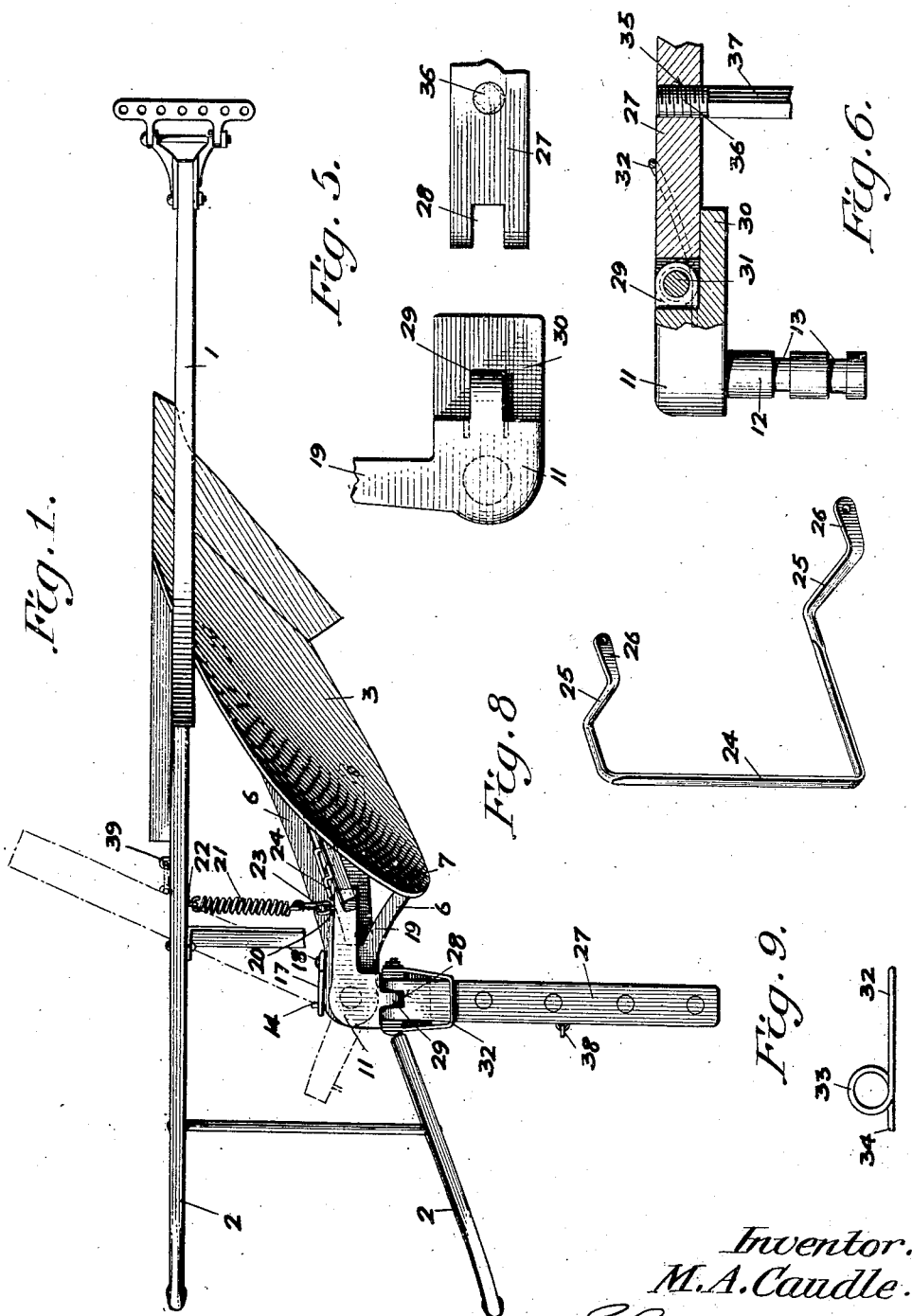
Inventor:
M. A. Caudle.
Attorneys.

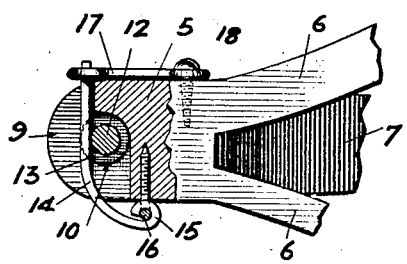
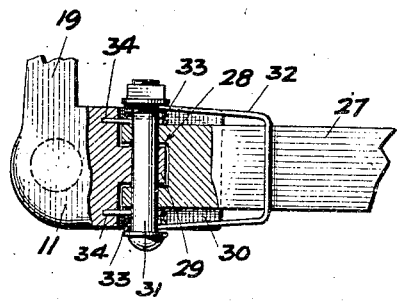
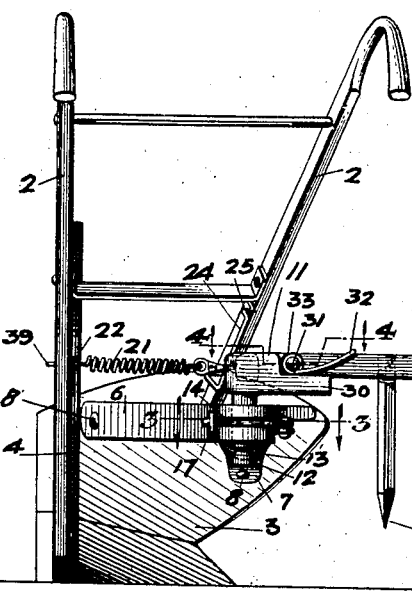
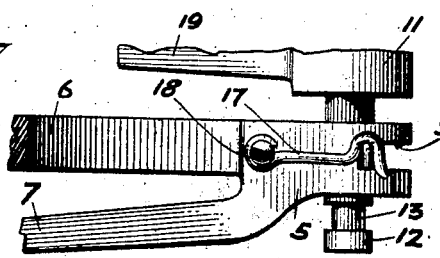

UNITED STATES PATENT OFFICE.

MELVEN A. CAUDLE, OF MABSCOTT, WEST VIRGINIA, ASSIGNOR OF ONE-HALF TO RUFUS A. HILL, OF MABSCOTT, WEST VIRGINIA.

HARROW ATTACHMENT.

1,251,636.  Specification of Letters Patent.  Patented Jan. 1, 1918.

Application filed May 24, 1917. Serial No. 170,700.

*To all whom it may concern:*

Be it known that I, MELVEN A. CAUDLE, a citizen of the United States of America, residing at Mabscott, in the county of Raleigh and State of West Virginia, have invented certain new and useful Improvements in Harrow Attachments, of which the following is a specification, reference being had therein to the accompanying drawing.

This invention relates to a harrow attachment and has for its principal object the production of an attachment for a plow which will immediately harrow the furrow which is being turned over by the mold board of the plow.

Another object of this invention is the production of a harrow attachment for plows which is yieldably supported adjacent the mold board so as to cause the furrow turned over by the mold board to engage the harrow and thus permit the furrow to be harrowed while the same is fresh, and since the harrow attachment is yieldably supported, it will easily move to accommodate undue pressure when coming into engagement with a foreign object or obstacle.

Another object of this invention is the production of a harrow attachment for plows which is mounted upon a frame connected to the plow in such a manner as to yield in either a vertical or horizontal plane thus permitting undue strain to be easily prevented from injuring the harrow attachment.

With these and other objects in view, this invention consist of certain novel combinations, constructions, and arrangements of parts as shall be hereinafter fully described.

In the accompanying drawings:

Figure 1 is a top plan view of the harrow attachment for plows, showing the same mounted upon a plow in position for use.

Fig. 2 is a rear elevation of the harrow attachment for plows.

Fig. 3 is a fragmentary sectional view through a portion of the attachment taken on the line 3—3 of Fig. 2 looking in the direction of the arrows.

Fig. 4 is a fragmentary sectional view through a portion of the attachment taken on the line 4—4 of Fig. 2.

Fig. 5 is a fragmentary top plan view of a portion of the hood and tooth bar of the attachment showing the same supported from each other.

Fig. 6 is a longitudinal section through a portion of the hood of the attachment and the tooth bar, thereby showing the same notched together.

Fig. 7 is an elevation of a portion of the frame and the stem of the hood of the attachment, illustrating the manner in which the stem is held in an engagement with the frame.

Fig. 8 is a detailed perspective view of a certain bracket used in connection with this device.

Fig. 9 is a side elevation of a certain coiled spring used in connection with this invention.

Referring to the accompanying drawings by numerals, it will be seen that the harrow attachment is to be used in connection with an ordinary plow, comprising the plow beam 1 having the usual handles 2 upon which the mold board 3 is supported in the usual manner upon a standard 4. It is obvious that this harrow attachment can be used and is intended to be used in connection with any form of a plow and therefore it is not deemed necessary to go further into the detailed description of the plow than the description above given.

The frame of the attachment comprises a body 5 having diverging horizontal arms 6 extending therefrom while the downwardly extending diverging arm 7 is also formed thereon and also extends in the same general direction as the arms 6. These arms 6 and 7 are of such length as to bear upon the rear surface of the mold board of the plow thus allowing the ends of the arms to be bolted to the mold board as indicated at 8. Thus it will be seen that the frame is fixedly mounted upon the mold board so as to project for a spaced distance beyond the rear surface of the mold board as shown clearly in Fig. 1. The body 5 of the frame is provided with a horizontal slot 9 extending over into the vertical opening 10, projects through the body 5 and connects with the slot 9 as shown clearly in Fig. 3.

The block 11 has a depending stem 12 formed thereon as shown in Fig. 6 and this stem 12 has a plurality of annular grooves 13 formed therein in spaced relation. This stem 12 projects through the opening 9 for supporting the block 11 of the attachment for permitting the block to be swung in a horizontal plane. In order to hold this stem in a vertical adjusted position and also for preventing the stem from being accidentally displaced, the curved bar 14 is provided at one end to form a sleeve as shown at 15. The screw or staple 16 passes through the sleeve 15, and this screw or staple 16 is carried by the body 5 of the frame, and it will be seen that the curved bar 14 will be evenly supported. After the stem 12 has been passed through the opening 10 formed in the body 5 of the frame the curved bar 14 is then swung into the slot 9 as shown in Fig. 3 so as to fit in one of the annular grooves 13 of the stem 12. Since this bar 14 will bear upon the body 5 and will fit within one of the grooves, it will be seen that the stem 12, although being permitted to ride upon the body, will be held from accidental displacement. The latch 17 is pivotally supported by a screw or other securing means 18 upon one of the diverging arms 6 and this latch 17 swings over and engages the projecting end of the curved bar 14 as shown in Figs. 3 and 7, and thus holds this bar against accidental displacement.

The block 11 is provided with a finger 19 formed integral thereon and projecting to one side of this finger 19 is a staple 20 fixedly connected thereto. The coil spring 21 is secured by an eye 22 to one of the handles 2 as shown in Fig. 1 while the pivoted end of the coiled spring 21 is movably connected by means of the snap hook 23 of the staple 20 secured by the finger 19 of the block 11 of the attachment. As a consequence it will be seen that the block is normally urged to pivot in one direction. In order to limit the pivotal movement of the block in one direction, however, there is provided a bracket as shown clearly in Figs. 1, 2, and 8, against which the end of the finger 19 is adapted to edge. This bracket comprises a U-shaped body 24 one side of which is considerably longer than the remaining side as shown clearly in Fig. 8. The projections 25 of the body 24 terminate in feet 26 extending at right angles thereto. These feet 26 are secured upon one of the handles 2 as shown in Figs. 1 and 2 whereby the bracket will be fixedly supported upon one handle in the path of movement of the finger 19 of the block 11 of the attachment. It will therefore be seen that when the finger 19 moves into engagement with the bracket, the pivotal movement of the block 11 will be limited.

The tooth bar 27 is provided with a bifurcated inner end 28 as shown clearly in Fig. 5 which receives the tongue 29 of the block 11.

The inner end of the tooth bar 27 is adapted to rest upon the horizontal flange 30 formed integrally upon the block 11. This flange 30 is formed in a plane below the outer surface of the block 11 and therefore provides sufficient space for the reception of the tooth bar 27 by causing the bar to project above the outer surface of the block 11 as shown in Fig. 2. A pivotal bolt 31 projects through the tongue 29 of the block 11 and through the bifurcated end 28 of the tooth bar 27 as shown in Fig. 4 thus mounting the tooth bar upon the block 11. While the provision of the flange 30 will limit the downward movement of the tooth bar 27, the tooth bar may swing upwardly when undue pressure is inserted thereon. In order to hold the tooth bar 27 normally in a horizontal plane for permitting the teeth carried thereby to be gripped in engagement with the furrow which is being turned, a U-shaped spring 32 is positioned so as to bear upon the outer surface of the tooth bar 27. This spring 32 is provided with a plurality of resilient convolutions 33 which fit upon the bolt 31 and over which project the ends 34 which extend into the block 11 of the attachment. Since this spring is anchored by the extending of the ends 34 into the block 11, this device, with the resiliency of the convolutions 33 in the body of the spring 32 will normally urge the tooth bar downwardly. This tooth bar is provided with a plurality of threaded openings 35 into which the threaded upper ends 36 of the collared teeth 37 are screwed. Therefore it is obvious that if a tooth is accidentally broken when in use the collar of the remaining end will permit a wrench or other suitable implement to be secured thereto for rotating the tooth for causing the threaded end 36 to be removed from the threaded opening 35 thus allowing a new tooth to be substituted.

When this harrow attachment is in use the stem 12 of the block 11 of the attachment is positioned in engagement with the body 5 of the frame and is held by the bar 14 as hereinbefore described. The tension of the coiled spring 21 will normally urge the free end of the tooth bar forwardly. The tension of the spring 32 will cause the free end of the tooth bar to be normally urged downwardly whereby the spring will yieldably hold the tooth bar in such a position as to cause the teeth 37 carried thereby to engage the furrow which is being turned over by the mold board 3 of the plow. By referring to Figs. 1 and 2, it will be seen that the teeth are in a plane to the rear and then to one side of the mold board 3, and as a consequence will engage the furrow being turned over. In this manner, while the furrow is fresh it can be more readily pulverized instead of using a separate harrow, and thus considerable time and labor is saved. If, however, a foreign object, such as a stump or rock should engage the teeth of the tooth bar, the tooth bar may swing rearwardly in a horizontal plane or may swing upwardly in a vertical plane so as to yield according to the undue pressure imparted thereto by the foreign object, for preventing the teeth of the tooth bar from being accidentally injured.

It is of course obvious that, if so desired, or when it it is not desired to harrow a furrow being turned over, or when the plow is not in use or is being conveyed from one place to another, the snap hook 23 may be released from the staple 20 and then the tooth bar 27 may be swung around to extend across the rear portion of the plow as indicated in dotted lines in Fig. 1. At this time latch 38 carried by the tooth bar 27 may be secured to the eye 39 mounted upon one of the handles 2, thus holding the tooth bar from swinging movement when not in use.

It is therefore not desired to limit the construction of this harrow attachment to the specific form as herein described but to include all forms of structure as properly come within the scope of the invention as claimed.

What is claimed is:

1. In a device of the class described the combination of a plow having a mold board, a frame comprising a body having diverging arms extending therefrom, said arms engaging said plow, means for securing said frame in a fixed position, a block pivotally mounted upon said body, means for normally urging said block in one direction, a tooth bar pivotally mounted upon said block, means for yieldably urging said tooth bar in one direction, harrowing elements carried by said tooth bar whereby said harrowing elements will harrow or pulverize a furrow turned by said mold board, and said tooth bar capable of upward or rearward movement when undue pressure is applied thereto.

2. In a device of the class described the combination of a plow having a mold board, a frame fixedly mounted upon said mold board, said frame having a slot formed therein, said frame having a vertical opening connecting with said slot, a block having a stem depending therefrom and extending through said opening, said stem having an annular groove, a bar pivotally mounted upon said frame and extending from said slot so as to fit in said groove whereby said stem will be held against accidental displacement, a latch carried by said frame and engaging said bar for holding said bar against displacement, and harrowing means connected to said bar.

3. In a device of the class described the combination of a plow having a mold board, a frame mounted upon said mold board, a block pivotally mounted upon said frame, a finger extending from said block, means for normally urging said finger in one direction, a bracket carried by said plow and extending in the path of movement of said finger, whereby the pivotal movement of said block will be limited in one direction, and harrowing means connected to said block whereby the harrowing means may harrow a furrow turned by said mold board, and said block being adapted to pivot when undue pressure is imparted to said harrowing means.

4. In a device of the class described the combination of a plow having a mold board, a frame carried by said plow, a block pivotally mounted upon said frame, means for normally urging said block to pivot in one direction, said block having a tongue and flange formed thereon, a tooth bar having a bifurcated end, said tongue extending into said bifurcated end causing said tooth bar to rest upon said flange, a pivoting means passing through said bifurcated tongue end, thereby pivotally securing said tooth bar upon said block, harrowing means mounted on said tooth bar, and means for normally urging said tooth in one direction, whereby said tooth bar may yield by independent movement or by movement in unison with said block when undue pressure is imparted thereto.

5. In the device of the class described, the combination of a plow having a mold board, a frame carried by said plow, a block having a stem projecting therefrom, said stem being mounted upon said frame, a tooth bar carried by said block, harrowing means carried by said tooth bar, and means carried by said frame and engaging stem for holding said stem at an adjusted height.

6. In a device of the class described, the combination of a plow having a mold board, a frame carried by said plow, a block having a stem projecting therefrom, said stem having annular grooves formed therein, a tooth bar pivotally mounted upon said block, harrowing means carried by said tooth bar, said stem being pivotally mounted upon said frame, means for urging said stem in one direction, and means removably fitting within one of said grooves for holding said stem at an adjusted height.

7. In a device of the class described, the combination of a plow having a mold board, a frame carried by said plow, a block having a stem projecting therefrom, said stem having annular grooves formed therein, a tooth bar pivotally mounted upon said block, harrowing means carried by said tooth bar, said stem being pivotally mounted upon said frame, means for urging said stem in one direction, a curved bar carried by said frame and fitting within one of said grooves for holding said stem at an adjusted height, and means for releasably holding said last mentioned bar in a set position.

8. In a device of the class described, the combination of a plow having a mold board, a frame comprising a body having arms projecting therefrom, means for securing said arms to said plow, a block pivotally mounted upon said frame, means for normally urging said block in one direction, a tooth bar carried by said block, and pulverizing means carried by said tooth bar.

In testimony whereof I hereunto affix my signature.

MELVEN A. CAUDLE.

Copies of this patent may be obtained for five cents each, by addressing the "Commissioner of Patents, Washington, D. C."